United States Patent
Toennies (10) Patent No.: US 12,410,825 B2
(45) Date of Patent: Sep. 9, 2025

(54) SYSTEM TO REDUCE LINE LOSS IN PRESSURE CONTROL HYDRAULIC CIRCUIT

(71) Applicant: CNH Industrial America LLC, New Holland, PA (US)

(72) Inventor: Heath A. Toennies, Eureka, IL (US)

(73) Assignee: CNH Industrial America LLC, New Holland, PA (US)

( * ) Notice: Subject to any disclaimer, the term of this patent is extended or adjusted under 35 U.S.C. 154(b) by 379 days.

(21) Appl. No.: 17/670,648

(22) Filed: Feb. 14, 2022

(65) Prior Publication Data

US 2022/0307527 A1    Sep. 29, 2022

Related U.S. Application Data (60) Provisional application No. 63/164,670, filed on Mar. 23, 2021.

(51) Int. Cl.
| | |
|---|---|
| *F15B 21/044* | (2019.01) |
| *F15B 13/06* | (2006.01) |
| *F15B 21/041* | (2019.01) |
| *A01B 63/10* | (2006.01) |

(52) U.S. Cl.
CPC ............ *F15B 21/044* (2013.01); *F15B 13/06* (2013.01); *F15B 21/041* (2013.01); *A01B 63/10* (2013.01); *F15B 2211/45* (2013.01)

(58) Field of Classification Search
CPC .. F15B 2211/45; F15B 21/041; F15B 21/044; F15B 2211/70
See application file for complete search history.

(56) References Cited

U.S. PATENT DOCUMENTS

| | | |
|---|---|---|
| 2013/0248306 A1 | 9/2013 | Ogawa et al. |
| 2019/0037759 A1 | 2/2019 | Aposhian et al. |

FOREIGN PATENT DOCUMENTS

| | | |
|---|---|---|
| EP | 0262098 | 3/1988 |
| EP | 2667037 | 11/2013 |
| FR | 2734608 | 11/1996 |
| JP | H1182427 A | * 11/1999 |

OTHER PUBLICATIONS

EP Application No. 22163675, European Search Report, dated Jul. 20, 2022, 9 pages.

* cited by examiner

*Primary Examiner* — Nathaniel E Wiehe
*Assistant Examiner* — Daniel S Collins
(74) *Attorney, Agent, or Firm* — Fletcher Yoder, P.C.

(57) ABSTRACT

A hydraulic system including a first cylinder conduit configured to couple to a cylinder, a second cylinder conduit configured to fluidly coupled to the cylinder, and a bypass conduit fluidly coupled both to the first cylinder conduit upstream of the cylinder and to the second cylinder conduit downstream of the cylinder. The bypass conduit is configured to enable intermittent fluid flow of a hydraulic fluid from the first cylinder conduit to the second cylinder conduit while bypassing at least a portion of the cylinder.

8 Claims, 4 Drawing Sheets

SYSTEM TO REDUCE LINE LOSS IN PRESSURE CONTROL HYDRAULIC CIRCUIT

CROSS-REFERENCE TO RELATED APPLICATION

This application claims priority from and the benefit of U.S. Provisional Application Ser. No. 63/164,670, entitled "System to Reduce Line Loss in Pressure Control Hydraulic Circuit," filed Mar. 23, 2021, which is hereby incorporated by reference in its entirety.

BACKGROUND

The present disclosure relates generally to an agricultural system and, more specifically, to reducing line loss in a pressure control hydraulic circuit of the agricultural system.

Certain agricultural implements include ground engaging tools configured to interact with the soil. For example, a tillage implement may include tillage points and/or disc blades configured to break up the soil for subsequent planting or seeding operations. Tillage implements typically include one or more actuators (e.g., hydraulic cylinders) configured to control a penetration depth of the ground engaging tools into the soil. The actuator(s) may also move the ground engaging tools between a lowered/ground engaging position and a raised/transport portion (e.g., to facilitate repositioning the tillage implement between successive rows). Furthermore, certain actuators may control the downforce applied by the ground engaging tools to the soil. The actuator(s) are controlled by a hydraulic system including a series of connections (e.g., hoses, lines, etc.) and valves disposed between the actuator(s) and a hydraulic fluid reservoir. Unfortunately, in certain conditions (e.g., cold weather) oil in the lines of the hydraulic system furthest away from the work vehicle (e.g., hydraulically coupled to the implement) remains cold and does not warm up during operation. The high viscosity of the cold oil results in hydraulic losses that hinder achieving the desired performance from the hydraulic system on the agricultural implement.

BRIEF DESCRIPTION

In certain embodiments, a hydraulic system includes a first cylinder conduit configured to couple to a cylinder, a second cylinder conduit configured to fluidly coupled to the cylinder, and a bypass conduit fluidly coupled both to the first cylinder conduit upstream of the cylinder and to the second cylinder conduit downstream of the cylinder. The bypass conduit is configured to enable intermittent fluid flow of a hydraulic fluid from the first cylinder conduit to the second cylinder conduit while bypassing at least a portion of the cylinder.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
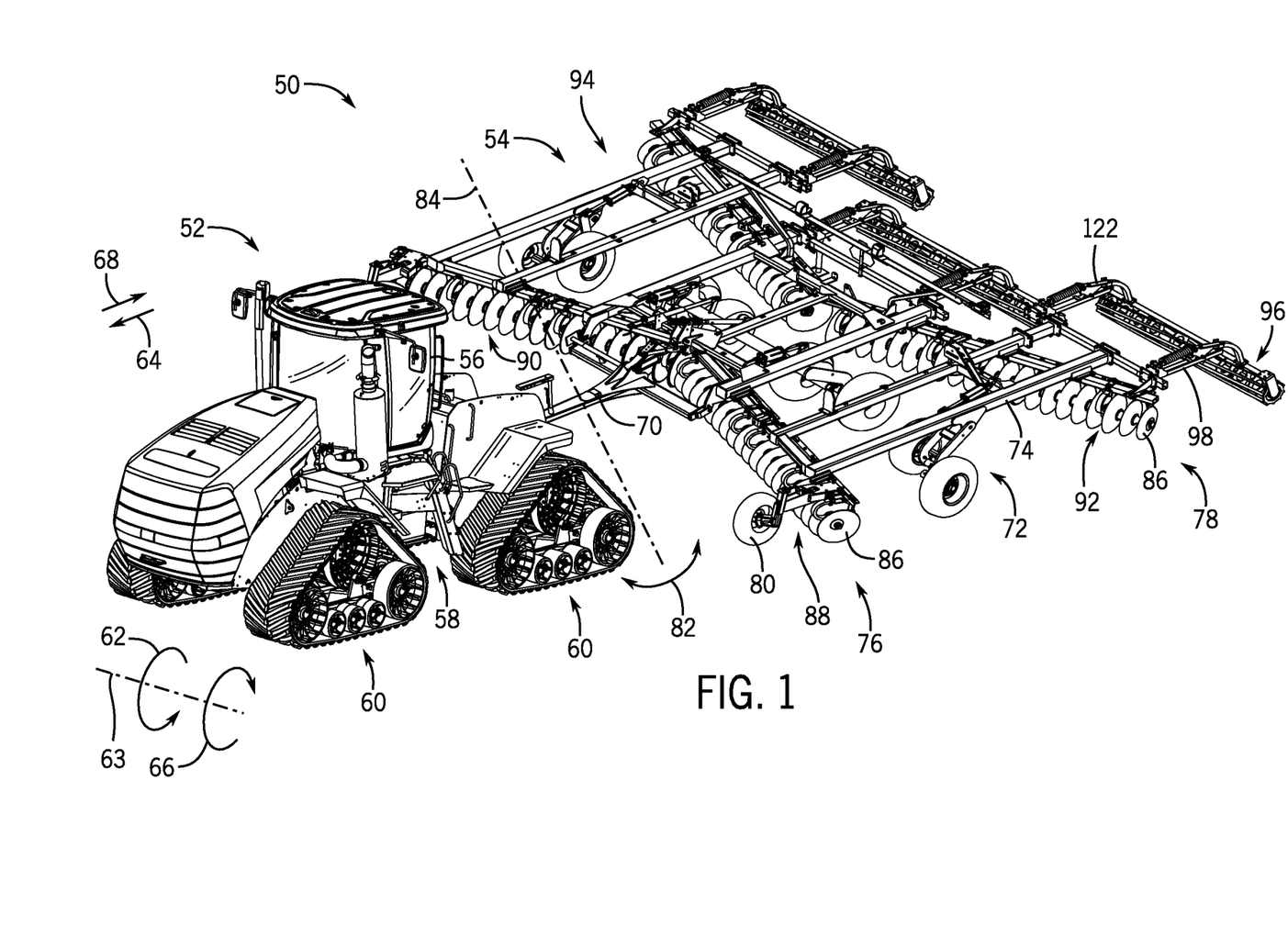
FIG. 1 is a perspective view of an embodiment of an agricultural system having a work vehicle and an agricultural implement, in accordance with an aspect of the present disclosure.

Turning to the drawings, FIG. 1 is a perspective view of an embodiment of an agricultural system 50 that includes a work vehicle 52 and an agricultural implement 54. In the illustrated embodiment, the work vehicle 52 is a tractor. However, in some embodiments, the work vehicle 52 may be an on-road truck, a harvester, and so forth, that may be driven over a field, such as a farming field. As illustrated, the work vehicle 52 includes a cab 56 mounted on a chassis 58. The chassis 58 may support components, such as a motor, a hydraulic system (e.g., a pump, valves, a reservoir), an electrical system (e.g., a control system), a cooling system (e.g., an engine coolant system, a heating, ventilation, and/or air conditioning system), and the like, to facilitate operation of the work vehicle 52. Additionally, the work vehicle 52 includes tracks 60 (e.g., wheels) that operate to move the work vehicle 52. For example, the front and/or the rear tracks 60 may rotate in a first rotational direction 62 (e.g., a forward rotational direction) about a lateral axis 63 to drive the work vehicle 52 in a first direction 64 (e.g., a forward direction), and the front and/or rear tracks 60 may rotate in a second rotational direction 66 (e.g., reverse rotational direction) about the lateral axis 63, opposite the first rotational direction 62, to drive the work vehicle 52 in a second direction 68 (e.g., backward direction), opposite the first direction 64. The tracks 60 (e.g., the front tracks and/or the rear tracks) may also be steered to turn the work vehicle 52. In additional or alternative embodiments, a portion (e.g., a rear portion) of the chassis may rotate relative to a remaining portion (e.g., a front portion) of the chassis to steer the work vehicle.

The cab 56 is configured to house an operator of the work vehicle 52 during operation of the agricultural system 50. The cab 56 may provide access to various controls of the work vehicle 52. For example, the cab 56 may include a user interface to enable the operator to control the operation of certain systems of the work vehicle 52. In some embodiments, the cab 56 may include a component, such as a steering wheel, to enable the operator to steer the tracks 60 to turn the work vehicle 52. In addition, the cab may include other and/or additional types of user interfaces (e.g., a touch screen, a hand controller, a push button, a track pad) configured to receive user input or feedback for controlling various operations and systems of the work vehicle.

Moreover, the chassis 58 is coupled to the agricultural implement 54 to enable the work vehicle 52 to tow the agricultural implement 54. For example, the chassis 58 may be coupled to a hitch 70 of the agricultural implement 54 (e.g., via a corresponding hitch of the work vehicle). In addition, the agricultural implement 54 includes main wheels 72 that enable the agricultural implement 54 to move, such as over the field through which the work vehicle 52 is navigating. Thus, movement of the work vehicle 52 drives movement of the agricultural implement 54. For example, movement of the work vehicle 52 in the first direction 64 drives the agricultural implement 54 to move in the first direction 64, and movement of the work vehicle 52 in the second direction 68 drives the agricultural implement 54 to move in the second direction 68. In certain embodiments, the agricultural implement 54 may also be steerable. By way of example, the main wheels 72 may be turned to steer the agricultural implement 54.

In some embodiments, the agricultural implement 54 may be a tilling implement (e.g., vertical tilling implement) configured to break up soil within the field during operation of the agricultural system 50. The agricultural implement 54 includes a frame 74 to which the main wheels 72 are coupled. As illustrated in FIG. 1, the main wheels 72 are located between a first end 76 (e.g., front end) of the agricultural implement 54 and a second end 78 (e.g., rear end) of the agricultural implement 54. The agricultural implement 54 includes gauge wheels 80 that are coupled to the frame 74, such as at the first end 76. The gauge wheels 80 may be used to reduce an amount of lateral and/or vertical movement of the agricultural implement 54 while the agricultural system 50 is in operation. For example, the gauge wheels 80 may engage the soil surface while the work vehicle 52 tows the agricultural implement 54, such that movement of the agricultural implement 54 along the lateral axis 63 and/or movement of the agricultural implement 54 along a vertical axis 84 is reduced.

The agricultural implement 54 also includes disc blades 86 that are coupled to the frame 74. In the illustrated embodiments, the disc blades 86 of the agricultural implement 54 are arranged in rows, including a first blade row 88, a second blade row 90, a third blade row 92, and a fourth blade row 94. The first blade row 88 and the second blade row 90 may each be positioned at the first end 76 of the agricultural implement 54, and the third blade row 92 and the fourth blade row 94 may each be positioned at the second end 78 of the agricultural implement 54. In some embodiments, the first blade row 88 may be positioned adjacent to and at an angle with respect to the second blade row 90, and the third blade row 92 may be positioned adjacent to and at an angle with respect to the fourth blade row 94. Thus, the blade rows 88, 90, 92, 94 may form an x-shaped configuration on the agricultural implement 54. In additional or alternative embodiments, the disc blades may be arranged in a different configuration on the agricultural implement (e.g., a k-shaped configuration, a diamond configuration, a parallel configuration), and/or the agricultural implement may include a different number of rows of disc blades.

During operation of the agricultural system 50, the disc blades 86 may engage soil of the field. For instance, the main wheels 72 may be positioned to set the position of the frame 74 at a target height above the soil surface. By way of example, the main wheels 72 may move (e.g., translate, rotate) away from the frame 74 to drive the frame 74 away from the soil surface, and the main wheels 72 may move toward the frame 74 to drive the frame 74 toward the soil surface. As the agricultural implement 54 is towed by the work vehicle 52, the disc blades 86 may rotate while engaged with the soil to till the soil. Each disc blade 86 may, for example, be non-translatably coupled to the frame 74, such that movement of the main wheels 72 relative to the frame 74 changes the position of the disc blades 86 relative to the soil surface (e.g., to engage or disengage the disc blades 86 from the soil). In some embodiments, the disc blades 86 may be concave or may have certain surface features (e.g., flutes) that facilitate tilling of the soil. In additional or alternative embodiments, the agricultural implement 54 may include other suitable type(s) of ground engaging tool(s), such as tillage points, tines, and so forth.

Although the position of the disc blades 86 relative to the soil surface is adjusted by controlling the position of the main wheels in the illustrated embodiment, in additional or alternative embodiments, the position of the disc blades may be adjusted in other manners. For example, the hitch may be raised and/or lowered relative to the soil surface (e.g., via adjustment of the hitch of the work vehicle) to adjust the position and/or a pitch of the agricultural implement, thereby adjusting the position of the disc blades relative to the soil surface. In further embodiments, the disc blades may be directly adjustable relative to the implement frame. For example, groups of disc blades may be adjustable via a subframe of the agricultural implement.

The agricultural implement 54 may include basket assemblies 96 (e.g., crumbler baskets), which may be disposed at the second end 78 of the agricultural implement 54. The basket assemblies 96 are configured to engage the soil surface during operation of the agricultural system 50. For example, as the work vehicle 52 tows the agricultural implement 54 in the first direction 64, each basket assembly 96 may provide a downward force on the soil and rotate to level the soil tilled by the disc blades 86 and/or to cut crop residue in the field. Although the agricultural implement 54 has three basket assemblies 96 in the illustrated embodiment, additional or alternative embodiments of the agricultural implement may have any suitable number of basket assemblies and/or any other suitable component(s) (e.g., tines) configured to level the soil during operation of the agricultural system. In some embodiments, the basket assemblies 96 may also stabilize the agricultural implement 54 during operation of the agricultural system 50. For example, the basket assemblies 96 may dampen vertical movement of the agricultural implement 54 by providing a downward pressure. The agricultural implement may have any suitable alternate configuration, such as having no gauge wheels, no main wheels, no baskets, any other suitable configuration, or any combination thereof. The agricultural implement may also be any other suitable type of agricultural implement, such as a planting implement, a seeding implement, and so forth.

In the illustrated embodiment, the agricultural implement 54 includes downforce actuators 122 (e.g., linear actuators)

configured to control a downforce applied by the basket assemblies 96 to the soil. The downforce actuator 122 extends from the frame 74 to a frame 98, which is pivotally coupled to the frame 74. As discussed in detail below, a hydraulic system is fluidly coupled to the actuators 122 and configured to control the actuators 122 during operation of the agricultural implement 54, thereby controlling the downforce applied by basket assemblies 96 to the soil. The actuators 122 can also move the basket assemblies 96 between lowered and raised positions. In certain embodiments, the hydraulic system includes a supply conduit configured to provide fluid (e.g., hydraulic fluid) to the actuator 122 and a return conduit configured to return the fluid to a reservoir.

In addition, while the hydraulic system described herein is used to control the downforce applied by the basket assemblies 96, in other embodiments, the hydraulic system may be utilized to control the force applied by other ground engaging tool(s) of the agricultural implement, the position of other ground engaging tool(s) of the agricultural implement, or a combination thereof. Furthermore, in certain embodiments, the hydraulic system may be utilized to control the force applied by/position of at least one ground engaging tool of another suitable implement (e.g., a planting implement, a seeding implement, a harvesting implement, etc.).

Figure 2:
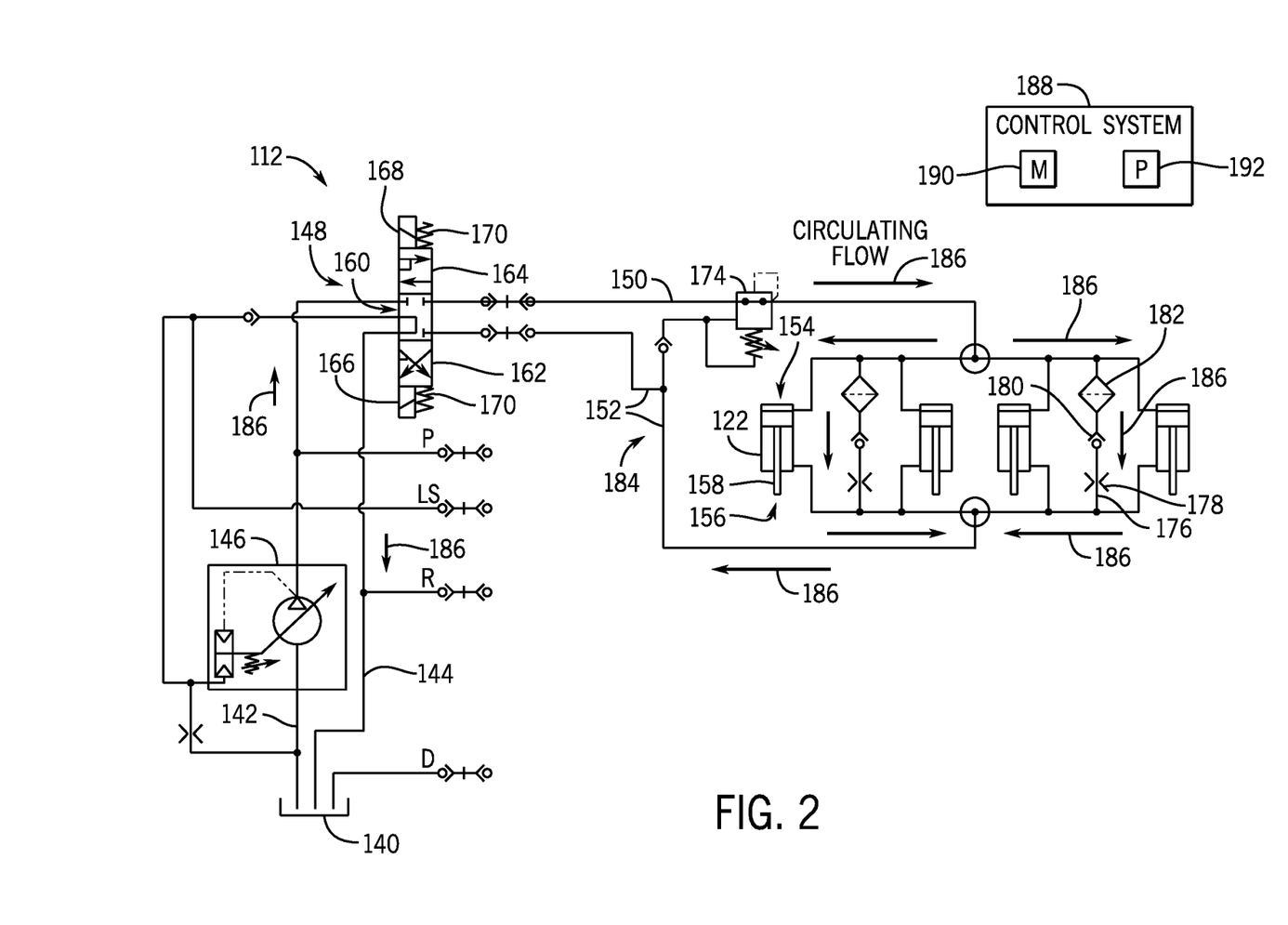
FIG. 2 is a schematic diagram of an embodiment of a hydraulic system that may be employed to control actuator(s) of the agricultural implement of FIG. 1.

FIG. 2 is a schematic diagram of an embodiment of the hydraulic system 112 that may be employed to control actuator(s) of the agricultural implement of FIG. 1. In the illustrated embodiment, the implement hydraulic system 112 is configured to control the downforce applied by the basket assemblies 96 to the soil. However, in other embodiments, the hydraulic system 112 may control the position of the basket assemblies 96 relative to the soil, or the hydraulic system 112 may control the force applied by/position of another suitable ground engaging tool.

In the illustrated embodiment, the hydraulic system 112 includes a supply conduit 142 configured to receive fluid (e.g., hydraulic fluid) from a reservoir 140, disposed on the work vehicle. The hydraulic system 12 also includes a return conduit 144 configured to return the fluid to the reservoir 140, disposed on the work vehicle. In addition, the hydraulic system 112 includes a pump 146 (e.g., hydraulic pump) disposed on the work vehicle, and the reservoir 140 (e.g., including a hydraulic fluid tank) is disposed on the work vehicle. The pump 146 is fluidly coupled to the reservoir 140 and configured to circulate hydraulic fluid through the hydraulic system 112.

Furthermore, the hydraulic system 112 includes a cylinder control valve 148 fluidly coupled to the supply conduit 142 and the return conduit 144. The cylinder control valve 148 is also fluidly coupled to a first cylinder conduit 150 and a second cylinder conduit 152 that are disposed on the implement. In the illustrated embodiment, the first cylinder conduit 150 is fluidly coupled to a pressure regulator 174 (e.g., pressure reducing and relieving valve) and a cylinder cap end 154 (e.g., first end) of the actuator 122 (e.g., double-acting cylinder), and the second cylinder conduit 152 is fluidly coupled to a rod end 156 (e.g., second end) of each actuator 122 (e.g., double-acting cylinder). The actuators 122 may be located near or at a rear portion of the agricultural implement (e.g., furthest away from the hitch). The pressure regulator 174 may be disposed adjacent a front portion of the agricultural implement (e.g., nearest the hitch). Thus, the hydraulic lines (e.g., first cylinder conduit 150 and the second cylinder conduit 152) may be a lengthy distance between the pressure regulator 174 and the actuators 122 making the hydraulic fluid in the lines subject to cold weather conditions. The pressure regulator 174 regulates the downforce applied by the basket assemblies via the actuators 122 when valve 168 connects fluid conduit 150 to the outlet of pump 146 and connects fluid conduit 152 to the return conduit 144. The pressure regulator 174, which is discussed in more detail below, enables fluid to flow through the first cylinder conduit 150 and blocks fluid flow from the first cylinder conduit 150 to the second cylinder conduit 152 while the fluid pressure within the first cylinder conduit 150 on the cylinder side of the pressure regulator 174 (e.g., within the cylinder cap end 154) is less than or equal to a threshold pressure. Providing fluid to the cylinder cap end 154 of each actuator 122 drives a respective piston rod 58 to extend and providing fluid to the rod end 156 of each actuator 122 drives the respective piston rod 158 to retract. In the illustrated embodiment, the extension force of the piston rod 158 increases the downforce applied by the basket assemblies (e.g., driving the basket assemblies into the ground), and is regulated by pressure control valve 174. Retraction of the piston rod 158 raises the basket off the ground when it is not in use. However, in other embodiments, extension of the piston rod may raise the baskets off the ground, and retraction of the piston rod may increase the downforce. In such embodiments, the first cylinder conduit 150 may be fluidly coupled to the pressure regulator 174 and to the rod end (e.g., first end) of the actuator, and the second cylinder conduit 152 may be coupled to the cap end (e.g., second end) of the actuator.

As depicted, multiple actuators 122 are utilized to control the downforce applied to the barrel assemblies. The number of actuators 122 may vary (e.g., 1, 2, 3, 4, or more). The actuators 122 are fluidly coupled in to one another in a parallel arrangement. While the illustrated actuators 122 are configured to control the downforce applied by the basket assemblies, in other embodiments, the actuator may be configured to control the downforce applied by other suitable ground engaging tool(s) (e.g., disc blade(s), one or more tillage point assemblies, etc.).

In the illustrated embodiment, the cylinder control valve 148 is a proportional three position/four way valve. The first position 160 of the cylinder control valve 148 is configured to block fluid flow between the supply conduit 142 and the first and second cylinder conduits and between the return conduit 144 and the first and second cylinder conduits, thereby blocking fluid flow between the supply conduit 142 and both ends of the actuator 122 and between the return conduit 144 and both ends of the actuator 122. The second position 162 of the cylinder control valve 148 is configured to facilitate fluid flow between the supply conduit 142 and the rod end 156 of the actuator 122 (e.g., via the second cylinder conduit 152) and between the return conduit 144 and the cylinder cap end 154 of the actuator 122 (e.g., via the first cylinder conduit 150) to drive the actuator 122 to raise the basket assembly away from the soil. The third position 164 of the cylinder control valve 148 is configured to facilitate fluid flow between the supply conduit 142 and the cylinder cap end 154 of the actuator 122 and between the return conduit 144 and the rod end 156 of the actuator 122 to drive the actuator 122 to increase the downforce applied by the basket assembly to the soil surface. In the illustrated embodiment, the cylinder control valve 148 is a proportional control valve configured to control the fluid flow rate through the valve (e.g., based on the position of the valve relative to the first position). However, in other embodiments, the cylinder control valve may be another suitable type of valve configured to control fluid flow between the supply and return conduits and the actuator.

In the illustrated embodiment, the cylinder control valve 148 includes a retract actuator 166 configured to drive the cylinder control valve 148 to the second position 162. And, the cylinder control valve 148 includes an extend actuator 168 configured to drive the cylinder control valve 148 to the third position 164. In the illustrated embodiment, the retract actuator 166 and the extend actuator 168 are electronic actuators (e.g., solenoids) configured to move the cylinder control valve 148 in response to receiving an electrical signal. In addition, the cylinder control valve 148 includes biasing elements 170 (e.g., springs) configured to urge the cylinder control valve 148 toward the first position 160. Accordingly, applying an electrical signal to the retract actuator 166 drives the cylinder control valve 148 to the second position 162, thereby causing the actuator 122 to raise the basket away from the soil. Furthermore, applying an electrical signal to the extend actuator 168 drives the cylinder control valve 148 to the third position 164, thereby causing the actuator 122 to increase the downforce applied by the basket assemblies to the soil. Furthermore, if no electrical signal is applied to either actuator, the biasing elements 170 drive the cylinder control valve 148 to the first position 160, thereby blocking fluid flow between the supply and return conduits and the actuator 122.

In the illustrated embodiment, the hydraulic system 112 includes bypass conduits 176 extending between the first cylinder conduit 150 and the second fluid conduit 152 that enable fluid flow (e.g., intermittent fluid flow) of the hydraulic fluid (e.g., oil) to bypass the actuators 122 during operation of the hydraulic system 112. Even though multiple bypass conduits 176 are illustrated, the number of bypass conduits 76 may vary (e.g., 1, 2, 3, 4, 5, or more). As depicted, the bypass conduits 176 are arranged between the actuators 122 in alternating pattern, the arrangement of the bypass conduits 176 may vary. For example, one or more bypass conduits 176 may be disposed on the outside of the actuators 122 (e.g., a pair of bypass conduits 176 may flank the actuators 122).

One or more flow features may be disposed along the bypass conduits 176 to promote flow of the hydraulic fluid from the first cylinder conduit 150 to the second cylinder conduit 152 via the bypass conduits 176 while bypassing the actuators 122. In the illustrated embodiment, an orifice 178 (e.g., bleed orifice) is disposed along each bypass conduit 176 to promote flow of the hydraulic fluid from the first cylinder conduit 150 to the second cylinder conduit 152 (e.g., from the pressure controlled end (via the pressure regulator 174) of the cylinder circuit to the other side of the cylinder circuit). The bleed orifice 178 also enables the purge of air and potentially other contaminants that may build up in portions of the hydraulic lines in the absence of continuously circulating hydraulic flow. In certain embodiments, a check valve 180 may be disposed along each bypass conduit 176. As depicted, each check valve 180 is disposed upstream (e.g., relative to a flow direction from the first cylinder conduit 150 the second cylinder conduit 152 via the bypass conduit 176). The check valve 180 enables hydraulic fluid to flow along the bypass conduit 176 (from the first cylinder conduit 150 to the second cylinder conduit 152) while keeping hydraulic fluid from flowing back in the opposite direction towards the first cylinder conduit 150. Blocking hydraulic fluid flow back in the opposite direction enables a ground engaging tool (e.g., basket assembly) to be held in a raised position when not in use. Thus, enabling the load holding function to be preserved while also enabling improved downpressure control. In certain embodiments, where the load holding function is not needed, the check valve 180 may not be present. In certain embodiments, as illustrated, a filter 182 (e.g., screen filter) is disposed along each bypass conduit 176 upstream of both the bypass conduit 176 and the check valve 180. The filter 182 keeps contaminants or particulates from entering into the orifice 178 and blocking or hindering fluid flow through the orifice. In certain embodiments, the filter 182 may be a different type of filter from the screen filter as long the as the filter keeps the contaminants from entering the orifice 178. As described in greater detail below, flow features other than the bleed orifice 178 may be utilized to enable hydraulic fluid flow from the first cylinder conduit 150 to the second cylinder fluid conduit 152 via the bypass conduits 176.

In the absence of the bypass conduits 76, in cold weather, the hydraulic fluid in the lines (e.g., portions of the first and second cylinder conduits 150, 152) becomes cold and increases in viscosity due to lack of circulation. Even during operation of the implement, the hydraulic fluid never warms up (e.g., due to cold, high viscosity hydraulic fluid remaining in the lines or due to the hydraulic fluid in the lines cooling due to heat transfer to the cold ambient environment). Instead, the cold, high viscosity hydraulic fluid remains in the first cylinder conduit 150 near the actuators 122 or moves back and forth between the pressure regulator 174 and the actuators 122. This would result in excessive line losses (e.g., hydraulic losses) causing pressure errors (and pressure spikes) in the pressure control circuit for the actuators 122. For example, pressure at the actuators may be significantly higher or lower than the nominal pressure setting at the valve due to the excessive line losses caused by cylinder motion with cold, high viscosity hydraulic fluid.

The bypass conduits 176 and associated flow features address the problems that cold weather may cause to the hydraulic system 112. The first cylinder conduit 150, the bypass conduits 176, and the second cylinder conduit 152 (along with the supply conduit 142 and the return conduit 144) form a circulation conduit 184 for a circulating flow of the hydraulic fluid (e.g., of warm hydraulic fluid from the work vehicle to the actuators 122 and back) as indicated by the arrows 186. Continuous circulating flow of the hydraulic fluid along the circulation conduit 184, while the implement is operating, enables maintenance of warm, low viscosity hydraulic fluid in the lines for improved performance (e.g., due to reduced hydraulic fluid viscosity, reduced line losses, reduced variations in pressure at the actuators 122, etc.), especially in hydraulic systems with long hydraulic lines between the pressure control system and the actuators.

One or more components of the hydraulic system 112 (e.g., pump 146, cylinder control valve 148, pressure regulator 174, certain flow features disposed along the bypass conduits 176, etc.) may be controlled by a control system 188. In particular, the control system 188 outputs control signal(s) to various components, such as to control power flow to the components to move and operate the components. The control system 188 includes a memory 190 and processing circuitry 192. The memory 90 may include volatile memory, such as random-access memory (RAM), and/or non-volatile memory, such as read-only memory (ROM), optical drives, hard disc drives, solid-state drives, or any other non-transitory computer-readable medium that includes instructions executable by the processing circuitry 192. The processing circuitry 192 may include one or more application specific integrated circuits (ASICs), one or more field programmable gate arrays (FPGAs), one or more general purpose processors, or any combination thereof, configured to execute the instructions stored in the memory 190 to operate the agricultural system (e.g., agricultural implement). For example, the instructions stored in the memory 190 cause the processing circuitry 192 to output a control signal to components of the hydraulic system 112 and direct fluid through the hydraulic system 112 to operate the agricultural system.

Figure 3:
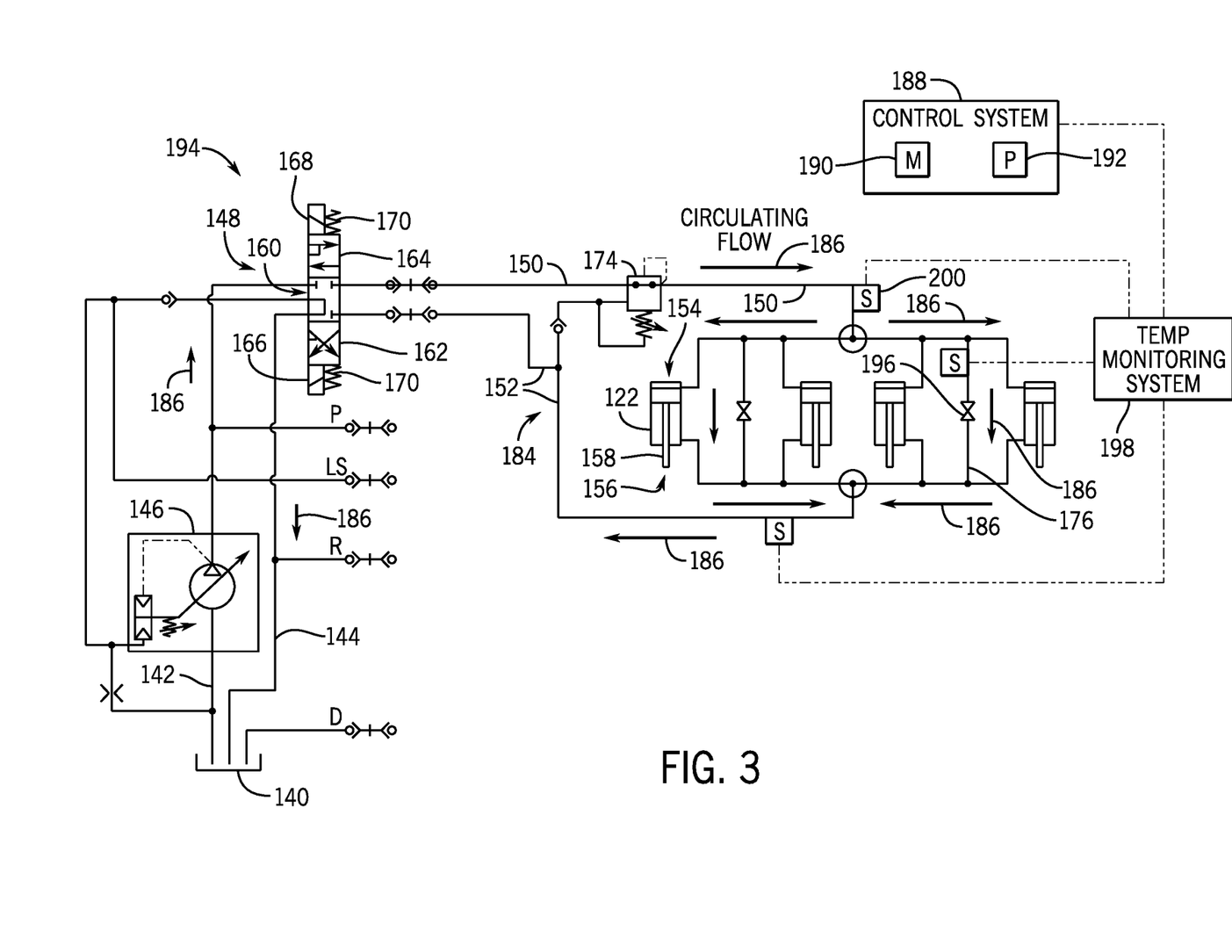
FIG. 3 is a schematic diagram of another embodiment of a hydraulic system that may be employed to control actuator(s) of the agricultural implement of FIG. 1.

FIG. 3 is a schematic diagram of another embodiment of a hydraulic system 194 that may be employed to control actuator(s) of the agricultural implement of FIG. 1. The hydraulic system 194 operates similar to the hydraulic system 112 in FIG. 2. However, the hydraulic system 194 includes a different type of flow feature. As illustrated, the hydraulic system 194 includes a valve 196 (illustrated by a generic valve) disposed along each bypass conduit 176 to regulate hydraulic flow (e.g., intermittent flow) from the first cylinder conduit 150 to the second cylinder conduit 152 while bypassing the actuators 122. In certain embodiments, the valve 196 may be electronic actuated directional valve (e.g., controlled by control signals from the control system 188). In other embodiments, the valve 196 may be pressure relief valve (e.g., controlled by control signals from the control system 188).

In certain embodiments, as depicted in FIG. 3, the hydraulic system 194 includes a temperature monitoring system 198 (e.g., thermostat device). The thermostat system 198 includes one or more sensors 200 (e.g., temperature transducers) to monitor a temperature of the hydraulic fluid. The sensors 200 may be disposed along the first cylinder conduit 150, the bypass conduits 176, and/or the second cylinder conduit 152. The sensors 200 provide feedback to the temperature monitoring system. The temperature monitoring system 198 may be communicatively coupled to the control system 188. Based on the feedback from the sensors 200, if the temperature of the hydraulic fluid reaches a certain threshold temperature (and, thus, the hydraulic fluid is warm enough to not adversely affect hydraulic operations), the flow features (e.g., valves 196) may be closed to stop the intermittent flow of hydraulic fluid from the first cylinder conduit 150 to the second cylinder conduit 152 via the bypass conduits 176. If the temperature of the hydraulic fluid has not reached a certain threshold temperature (e.g., is lower than the threshold temperature), the flow features (e.g., valves 196) remain open to enable the intermittent flow of the hydraulic fluid across the bypass conduits 176. Although the temperature monitoring system 198 is utilized in conjunction with the flow features in FIG. 3, the temperature monitoring system 198 may be utilized with other flow features.

Figure 4:
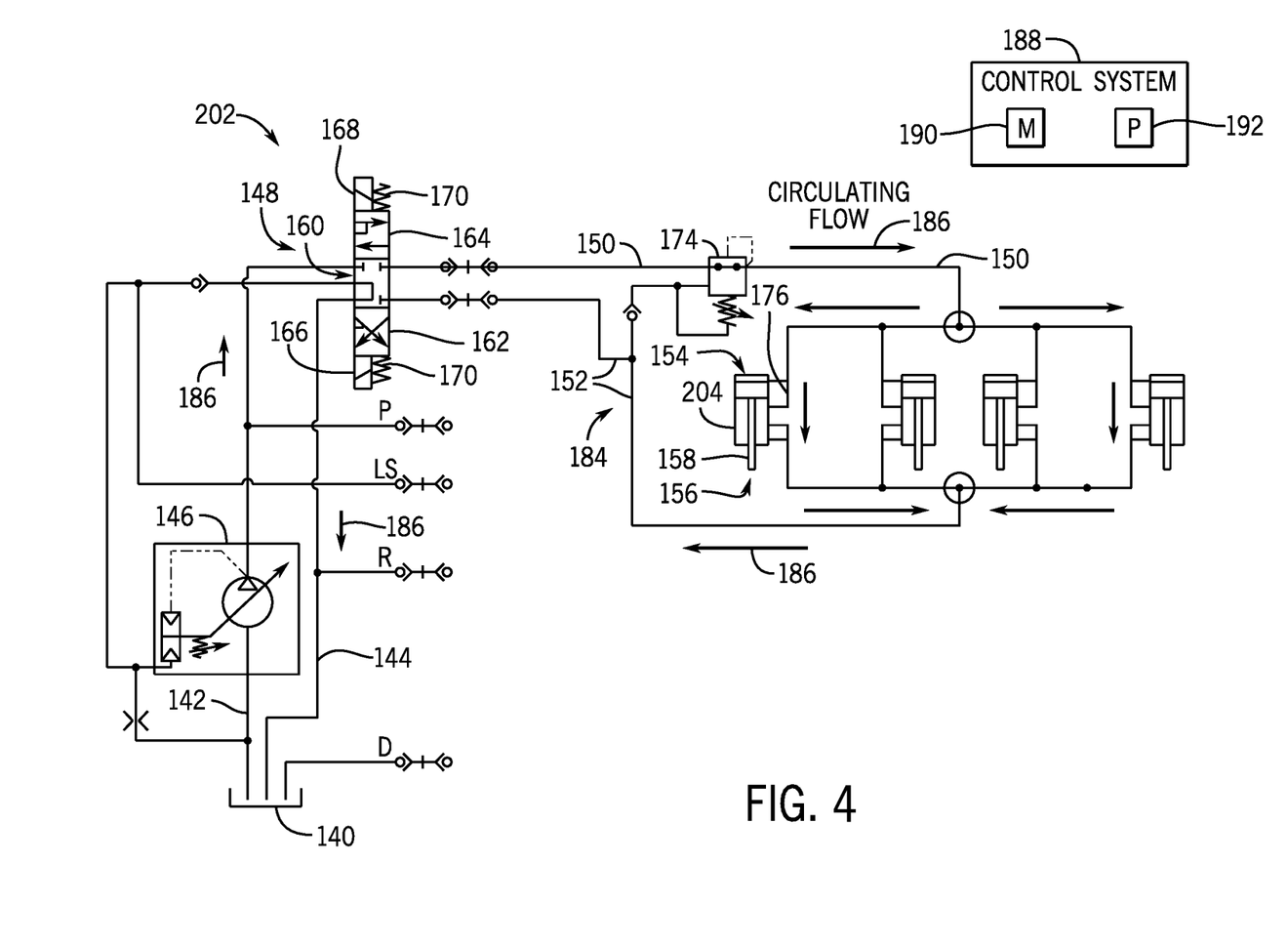
FIG. 4 is a schematic diagram of another embodiment of a hydraulic system that may be employed to control actuator(s) of the agricultural implement of FIG. 1.

FIG. 4 is a schematic diagram of another embodiment of a hydraulic system 202 that may be employed to control actuator(s) of the agricultural implement of FIG. 1. Unlike the hydraulic systems 112, 194 in FIGS. 2 and 3, the hydraulic system 202 does not utilize separate bypass conduits with flow features that promote intermittent flow of the hydraulic fluid from the first cylinder conduit 150 to the second cylinder conduit 152 bypassing the actuators. Instead, the hydraulic system 202 utilizes rephasing cylinders 204 as the actuators. Each rephasing cylinder 204 includes the bypass conduit 176 to enable hydraulic fluid to bypass the cylinder piston seal (and thus the piston) when the piston is either in a fully extended or retracted position. The bypass conduit 176 may include a passageway within the wall or on the inside of the wall of the cylinder 204. The bypass conduits 176 enable the hydraulic fluid to pass from the first cylinder conduit 150 to the second cylinder conduit 152 while bypassing a portion of the cylinder 204 (e.g., the piston). The bleeding of the hydraulic fluid promotes circulation of the hydraulic fluid along the circulation conduit 184.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hydraulic system comprising:
 a first cylinder conduit configured to fluidly couple to a cylinder;
 a second cylinder conduit configured to fluidly coupled to the cylinder; and
 a bypass conduit fluidly coupled both to the first cylinder conduit at a first end of the cylinder and to the second cylinder conduit at a second end of the cylinder opposite the first end, wherein the bypass conduit is configured to enable intermittent fluid flow of a hydraulic fluid from the first cylinder conduit to the second cylinder conduit while bypassing at least a portion of the cylinder, wherein the cylinder comprises a rephasing cylinder having a piston, wherein the rephasing cylinder comprises the bypass conduit, and the bypass conduit is configured to enable the intermittent fluid flow of the hydraulic fluid from the first cylinder conduit to the second cylinder conduit while bypassing the piston of the rephasing cylinder.

2. The hydraulic system of claim 1, wherein the first cylinder conduit, the bypass conduit, and the second cylinder conduit form a portion of a circulation conduit that enables circulating flow of the hydraulic fluid along the circulation conduit that causes the hydraulic fluid to be at a viscosity that minimizes hydraulic losses along the circulation conduit.

3. A hydraulic system, comprising:
 a first cylinder conduit;
 a second cylinder conduit;
 a cylinder fluidly coupled to the first cylinder conduit and the second cylinder conduit;
 a bypass conduit fluidly coupled both to the first cylinder conduit at a first end of the cylinder and to the second cylinder conduit at a second end of the cylinder opposite the first end, wherein the bypass conduit is configured to enable intermittent fluid flow of a hydraulic fluid from the first cylinder conduit to the second cylinder conduit while bypassing the cylinder, and wherein the first cylinder conduit, the bypass conduit, and the second cylinder conduit form a circulation conduit configured to enable circulating flow of the hydraulic fluid along the circulation conduit;
 a valve disposed along the bypass conduit, wherein the valve is configured to enable intermittent fluid flow of the hydraulic fluid from the first cylinder conduit to the second cylinder conduit while bypassing the cylinder;
a plurality of temperature sensors disposed along the first cylinder conduit, the second cylinder conduit, and the bypass conduit; and
a temperature monitoring system configured to monitor a temperature of the hydraulic fluid based on feedback from the plurality of temperature sensors and to cause blocking of the intermittent flow of the hydraulic fluid from the first cylinder conduit to the second cylinder conduit along the bypass conduit when the temperature reaches a threshold temperature by closing the valve.

4. A hydraulic system for an agricultural implement having a ground engaging tool, comprising:
a first cylinder conduit;
a second cylinder conduit;
a cylinder fluidly coupled to the first cylinder conduit and the second cylinder conduit;
a bypass conduit fluidly coupled both to the first cylinder conduit at a first end of the cylinder and to the second cylinder conduit at a second end of the cylinder opposite the first end; and
a bleed orifice disposed along the bypass conduit, wherein the bleed orifice is configured to enable intermittent fluid flow of a hydraulic fluid from the first cylinder conduit to the second cylinder conduit while bypassing the cylinder while the ground engaging tool is being actuated by the hydraulic system.

5. The hydraulic system of claim 4, comprising a check valve disposed along the bypass conduit, wherein the check valve is configured to block fluid flow back to the first fluid conduit along the bypass conduit.

6. The hydraulic system of claim 5, wherein the check valve is disposed upstream of the bleed orifice along the bypass conduit.

7. The hydraulic system of claim 5, comprising a screen filter disposed along the bypass conduit, wherein the screen filter is disposed upstream of the check valve and is configured to keep contaminants from entering the check valve and blocking fluid flow through the check valve.

8. The hydraulic system of claim 4, wherein the first cylinder conduit, the bypass conduit, and the second cylinder conduit form a circulation conduit configured to enable circulating flow of the hydraulic fluid along the circulation conduit.

* * * * *